US012599110B1

(12) United States Patent
Qiu

(10) Patent No.: US 12,599,110 B1
(45) Date of Patent: Apr. 14, 2026

(54) SLOW FEEDER

(71) Applicant: Jiangsu Wellspring PET Articles Co., Ltd., Yancheng (CN)

(72) Inventor: Bin Qiu, Yancheng (CN)

(73) Assignee: Jiangsu Wellspring PET Articles Co., Ltd., Yancheng (CN)

( * ) Notice: Subject to any disclaimer, the term of this patent is extended or adjusted under 35 U.S.C. 154(b) by 0 days.

(21) Appl. No.: 19/026,567

(22) Filed: Jan. 17, 2025

(30) Foreign Application Priority Data

Oct. 11, 2024 (CN) .......................... 202422456314.4

(51) Int. Cl.
A01K 5/01 (2006.01)
(52) U.S. Cl.
CPC ................................... A01K 5/0114 (2013.01)
(58) Field of Classification Search
CPC ...... A01K 5/01; A01K 5/0108; A01K 5/0114;
A01K 5/0287; A01K 15/0201
USPC ....................................................... 119/51.01
See application file for complete search history.

(56) References Cited

U.S. PATENT DOCUMENTS

| | | | | |
|---|---|---|---|---|
| 4,823,738 | A | * | 4/1989 | Gold .................... A01K 5/0114 |
| | | | | 119/51.01 |
| 5,000,123 | A | * | 3/1991 | Morse .................. A01K 5/0135 |
| | | | | 119/61.54 |
| D1,038,539 | S | * | 8/2024 | Hu ............................... D30/129 |
| D1,089,874 | S | * | 8/2025 | Salyer .......................... D30/129 |
| 2007/0089678 | A1 | * | 4/2007 | Greenwood ......... A01K 5/0114 |
| | | | | 119/61.5 |

| | | | | |
|---|---|---|---|---|
| 2008/0289581 | A1 | * | 11/2008 | Cox, Jr. ................. A01K 7/005 |
| | | | | 119/61.54 |
| 2009/0031962 | A1 | * | 2/2009 | Webber .............. A01K 39/0206 |
| | | | | 119/51.01 |
| 2013/0125823 | A1 | * | 5/2013 | Simon .................. A01K 5/0114 |
| | | | | 119/61.5 |

(Continued)

FOREIGN PATENT DOCUMENTS

FR 3096871 A1 * 12/2020 ............... A01K 7/00

OTHER PUBLICATIONS

Puzzle Feeder, "Slow Feeder Dog Bowl . . . ", Sep. 28, 2023, Amazon; https://www.amazon.com/Puzzle-Feeder-Boredom-Anxiety-Reducer/dp/BOCK124NLM/ref=sr_1_21_sspa?crid=11JG5GEBMLWFD&dib=eyJ2ljoiMSJ9.b-OiXknrGvkm4YDo5K74h-zZd2jDO9SJPNxY4yp7B-tAQkWrqCJ7Voi_96mfbbnHreWjbG-6PRpXHhqk_pvC4J1hRzHol82F1ZwWze8XNBx7_LtPloXdJIBixwQRqpBE5KOKqfWRt4tfvncKGgfm557btTg-oJcEVcJoexgi2E14666ktefRqleS9qTPgGPfstf7nuFXuLy9NOENB7SfFyOKJaMeXCHPsreVM1D-ivmpmzRSeX8kbDS7vrnMVGvf8yJVAkguwx9oopG2hrOd013ufMcrWdubllJmAnRSnc.2TgaM7h3HxWD9WQeyMMe10HqiGSipEkXioNIWxUw99M&dib_tag=se&keywords=rotating+slow+feeder&qid=1756419154&sprefix=rotating+slow+feeder%2Caps%2C144&sr=8-21-spons&sp_csd=d2lkZ2V0TmFtZT1zcF9tdGY&psc=1 (Year: 2023).*

(Continued)

*Primary Examiner* — Kimberly S Berona
*Assistant Examiner* — Erica Michelle Huebner
(74) *Attorney, Agent, or Firm* — Cooper Legal Group, LLC

(57) ABSTRACT

A slow feeder includes a bowl, a connection assembly, and at least one slow feeding assembly. A first accommodating cavity is provided in the bowl. The connection assembly is arranged in the first accommodating cavity. The at least one slow feeding assembly is rotatably connected to the connection assembly. During eating, a pet has to push the at least one slow feeding assembly in order to eat up all pet food inside the bowl. Because the at least one slow feeding (Continued)

assembly needs to be continuously pushed, the eating speed of the pet can be slowed down, thereby reducing the occurrence of digestive system diseases in the pet. The connection assembly can provide a mounting position for the at least one slow feeding assembly to ensure that the at least one slow feeding assembly can rotate normally.

6 Claims, 9 Drawing Sheets

(56) References Cited

U.S. PATENT DOCUMENTS

| | | | |
|---|---|---|---|
| 2018/0352782 A1* | 12/2018 | Miller | A01K 5/0114 |
| 2023/0255177 A1* | 8/2023 | Axelrod | A01K 5/0114 |
| | | | 119/51.01 |

OTHER PUBLICATIONS

Chewffon, "Interactive Spinning Puppy Puzzle Toy and Slow Feeder . . . ", Aug. 7, 2024, Amazon; https://www.amazon.com/dp/ B0DCG6PBPL/ref=sspa_dk_detail_3?psc=1&pd_rd_i=B0DCG6PBPL &pd_rd_w=0ljqE&content-id=amzn1.sym.386c274b-4bfe-4421- 9052-a1a56db557ab&pf_rd_p=386c274b-4bfe-4421-9052- a1a56db557ab&pf_rd_r=P0RZGP6GS40M33ES655Q&pd_rd_wg= EV40w&pd_rd_r=1398ab86-ee43-4310-8ba0-303064332e7b&sp_ csd=d2lkZ2V0TmFtZT1zcF9kZXRhaWxfdGhlbWF0aWM (Year: 2024).*

Outward Hound, "Outward Hound by Nina Ottosson Lickin' Layers Small 3-in-1 Dog Puzzle Feeder . . . ", Mar. 2, 2023, Amazon; https://www.amazon.com/Ottosson-Outward-Hound-Interactive- Puppies/dp/B0BXBBY51J/ref=sr_1_53?crid=11JG5GEBMLWFD &dib=eyJ2ljoiMSJ9.b-OiXknrGvkm4YDo5K74h- zZd2jDO9SJPNxY4yp7B-tAQkWrqCJ7Voi_96mfbbnHreWjbG- 6PRpXHhqk_pvC4J1hRzHol_82F1ZwWze8XNBx7_ LtPloXdJIBixwQRqpBE5KOKqfWRt4tfvncKGgfm557btTg-oJcEV cJoexgi2E14666ktefRqleS9qTPgGPfstf7nuFXuLy9N0ENB7SfFyO KJaMeXCHPsreVM1D-ivmpmzRSeX8kbDS7vrnMVGvf8yJVAkg uwx9oopG2hrOd013ufMcrWdubllJmAnRSnc. 2TgaM7h3HxWD9WQeyMMe10HqiGSipEkXioNIWxUw99M&dib_ tag=se&keywords=rotating%2Bslow%2Bfeeder&qid=1756419154 &sprefix=rotating%2Bslow%2Bfeeder%2Caps%2C144&sr=8-53 &th=1 (Year: 2023).*

* cited by examiner

A

17

22

11

16

14

12

15    18

22

17

16

18

19

SLOW FEEDER

CROSS REFERENCE TO THE RELATED APPLICATIONS

This application is based upon and claims priority to Chinese Patent Application No. 202422456314.4, filed on Oct. 11, 2024, the entire contents of which are incorporated herein by reference.

TECHNICAL FIELD

The present disclosure relates to the field of pet products, and specifically to a slow feeder.

BACKGROUND

With the development of the times and the progress of society, pets have become members of many modern families. To keep pets well, suitable feeders need to be used, because many pets gobble up their food, which is likely to cause digestive system diseases.

SUMMARY

To solve the technical problem that many pets gobble up their food and suffer from digestive system diseases, an objective of the present disclosure is to provide a slow feeder.

To achieve the above objective, an embodiment of the present disclosure provides a slow feeder, including a bowl, a connection assembly, and at least one slow feeding assembly. A first accommodating cavity is provided in the bowl. The connection assembly is arranged in the first accommodating cavity. The at least one slow feeding assembly is rotatably connected to the connection assembly.

The first accommodating cavity is provided inside the bowl, the connection assembly is arranged in the first accommodating cavity, and the connection assembly can provide a mounting position for the at least one slow feeding assembly and can facilitate rotation of the at least one slow feeding assembly. The at least one slow feeding assembly is arranged, and pet food is placed in the at least one slow feeding assembly and at a bottom of the first accommodating cavity. Therefore, a pet has to eat up the pet food in the at least one slow feeding assembly and rotate the at least one slow feeding assembly before having access to the pet food at the bottom of the first accommodating cavity. The arrangement of the at least one slow feeding assembly can slow down the eating speed of the pet and reduce the occurrence of digestive system diseases in the pet.

In addition, the slow feeder according to the embodiment of the present disclosure may further have the following additional technical features.

In the above technical solution, the connection assembly includes: a first connecting rod, where a first end of the first connecting rod is fixedly connected to a bottom of the first accommodating cavity; and a second connecting rod, where one end of the second connecting rod is fixedly connected to a second end of the first connecting rod.

The bottom of the first accommodating cavity is fixedly connected with the first end of the first connecting rod, the second end of the first connecting rod is fixedly connected with the end of the second connecting rod, and an outer diameter of the first connecting rod is greater than an outer diameter of the second connecting rod. As such, the at least one slow feeding assembly can be rotatably connected to the second connecting rod, so that the first connecting rod can support the at least one slow feeding assembly, to ensure that there is a gap between the at least one slow feeding assembly and the bottom of the first accommodating cavity, and pet food can be conveniently placed to the bottom of the first accommodating cavity.

In the above technical solution, the at least one slow feeding assembly includes: an annular step, arranged on an inner wall of the first accommodating cavity; a rotating ring, rotatably connected to the second connecting rod; and a slow feeding tray, where a first end of the slow feeding tray is fixedly connected to the rotating ring, a second end of the slow feeding tray is provided with a sliding plate slidably connected to the annular step, and a second accommodating cavity is provided inside the slow feeding tray.

The second connecting rod is rotatably connected with the rotating ring, the inner wall of the first accommodating cavity is provided with the annular step, the slow feeding tray is provided between the rotating ring and the annular step, and the second accommodating cavity is provided inside the slow feeding tray. Therefore, pet food can be placed in the second accommodating cavity, and can also be placed at the bottom of the first accommodating cavity, and the pet food at the bottom of the first accommodating cavity is blocked by the slow feeding tray, to ensure that the pet has to eat the pet food on the slow feeding tray first and then rotate the slow feeding tray before having access to the pet food in the first accommodating cavity, thus slowing down the eating speed of the pet.

In the above technical solution, the slow feeding tray is fan-shaped, a circle center of the slow feeding tray is fixedly connected to the rotating ring, and an arc of the slow feeding tray is slidably connected to an inner wall of the annular step.

The slow feeding tray is configured to be fan-shaped, the circle center of the slow feeding tray is fixedly connected to the rotating ring, and the arc of the slow feeding tray is slidably connected to the inner wall of the annular step. As such, the slow feeding tray is always staggered from the bottom of the first accommodating cavity by a space, to ensure that the pet can have access to the pet food at the bottom of the first accommodating cavity.

In the above technical solution, inner diameters of a plurality of the annular steps are in ascending order in a direction from the bottom of the first accommodating cavity to outside of the first accommodating cavity.

Because the inner diameters of the plurality of the annular steps are in the ascending order in the direction from the bottom of the first accommodating cavity to the outside of the first accommodating cavity, the slow feeding tray adjacent to the bottom of the first accommodating cavity may be mounted first during assembly of the slow feeder, thereby reducing the assembly difficulty.

In the above technical solution, fan angles of a plurality of the slow feeding trays are in descending order in a direction from the bottom of the first accommodating cavity to outside of the first accommodating cavity.

Because the fan angles of the plurality of slow feeding trays are in the descending order in the direction from the bottom of the first accommodating cavity to the outside of the first accommodating cavity, it can be ensured that when the pet is eating, the slow feeding tray away from the first accommodating cavity does not completely cover the slow feeding tray adjacent to the first accommodating cavity, and the pet can see clearly that there is pet food inside each of the plurality of slow feeding trays. As such, the eating desire of the pet is guaranteed. Meanwhile, the pet also has to eat up the pet food in each slow feeding tray in sequence, so the eating speed of the pet is slowed down.

In the above technical solution, a first protrusion is arranged on each of the bottom of the first accommodating cavity and a bottom of the second accommodating cavity.

With the arrangement of the first protrusion on each of the bottom of the first accommodating cavity and the bottom of the second accommodating cavity, the first protrusions serve as barriers when the pet is eating, thus slowing down the eating speed of the pet.

In the above technical solution, the slow feeder further includes: a first through hole, provided in the second connecting rod; a connecting plate, arranged in the first through hole, where a side of the connecting plate away from the first connecting rod is provided with a slide rail, the slide rail is arranged on an inner wall of the first through hole, and a second through hole is provided on the connecting plate; a first limiting member, where a first end of the first limiting member is fixedly connected to a side of the connecting plate adjacent to the first connecting rod, and a second end of the first limiting member is inclined toward the first connecting rod; a second limiting member, slidably connected to an interior of the first through hole, where the second limiting member is arranged on the side of the connecting plate away from the first connecting rod, the second limiting member is provided with a positioning plane, the positioning plane corresponds to a position of the slide rail, a length of the positioning plane is greater than a length of the second limiting member, and the positioning plane runs through the second through hole; a third limiting member, fixedly connected to an end of the second limiting member away from the first connecting rod, where an outer diameter of the third limiting member is greater than an inner diameter of the first through hole and less than or equal to an outer diameter of the second connecting rod; a receiving groove, provided on a side of the rotating ring away from the first connecting rod, where the third limiting member is arranged in the receiving groove; a fourth limiting member, fixedly connected to an end of the positioning plane away from the third limiting member, where the fourth limiting member is arranged on the side of the connecting plate adjacent to the first connecting rod; a positioning hole, provided on the rotating ring, where the positioning hole is connected to an inner wall of the rotating ring; and a second protrusion, arranged on an outer wall of the third limiting member, where a shape of the second protrusion matches a shape of the positioning hole.

Through the cooperation between the slide rail and the positioning plane, the position where the second limiting member is inserted into the first through hole can be accurately determined, to ensure that the fourth limiting member can be smoothly moved through the second through hole to the side of the connecting plate adjacent to the first connecting rod. Through the cooperation between the fourth limiting member and the first limiting member, loosening of the fourth limiting member can be prevented, to ensure that the third limiting member can be fixed to an end of the second connecting rod away from the first connecting rod. The third limiting member functions to limit the rotating ring, to prevent the rotating ring from sliding off from the second connecting rod.

In the above technical solution, a suction cup is arranged at a bottom of the bowl.

With the arrangement of the suction cup at the bottom of the bowl, the bowl can be attached to the ground, to prevent the bowl from shaking and turning over.

Additional aspects and advantages of the present disclosure will be apparent from the description below, or understood through practice of the present disclosure.

BRIEF DESCRIPTION OF THE DRAWINGS

The above and/or other additional aspects and advantages of the present disclosure become apparent and comprehensible from the description of embodiments in connection with accompanying drawings, in which:

In FIG. 1 to FIG. 9, the reference numerals respectively represent:

1. bowl; 2. first accommodating cavity; 3. first connecting rod; 4. second connecting rod; 5. annular step; 6. rotating ring; 7. slow feeding tray. 8. sliding plate; 9. second accommodating cavity; 10. first protrusion; 11. first through hole; 12. connecting plate; 13. slide rail; 14. second through hole; 15. first limiting member; 16. second limiting member; 17. third limiting member; 18. fourth limiting member; 19. positioning plane; 20. receiving groove; 21. positioning hole; 22. second protrusion; 23. suction cup.

DETAILED DESCRIPTION OF THE EMBODIMENTS

To make the objectives, features, and advantages of the present disclosure more comprehensible, the present disclosure will be described in detail below with reference to the accompanying drawings and specific embodiments. It should be noted that the embodiments of the present disclosure and the features in the embodiments may be combined with each other without conflict.

Many specific details are set forth in the following description to provide a full understanding of the present disclosure. However, the present disclosure can also be implemented in other ways different from those described herein, so the scope of protection of the present disclosure is not limited by the specific embodiments disclosed below.

A slow feeder according to some embodiments of the present disclosure will be described below with reference to FIG. 1 to FIG. 9.

Figure 1:
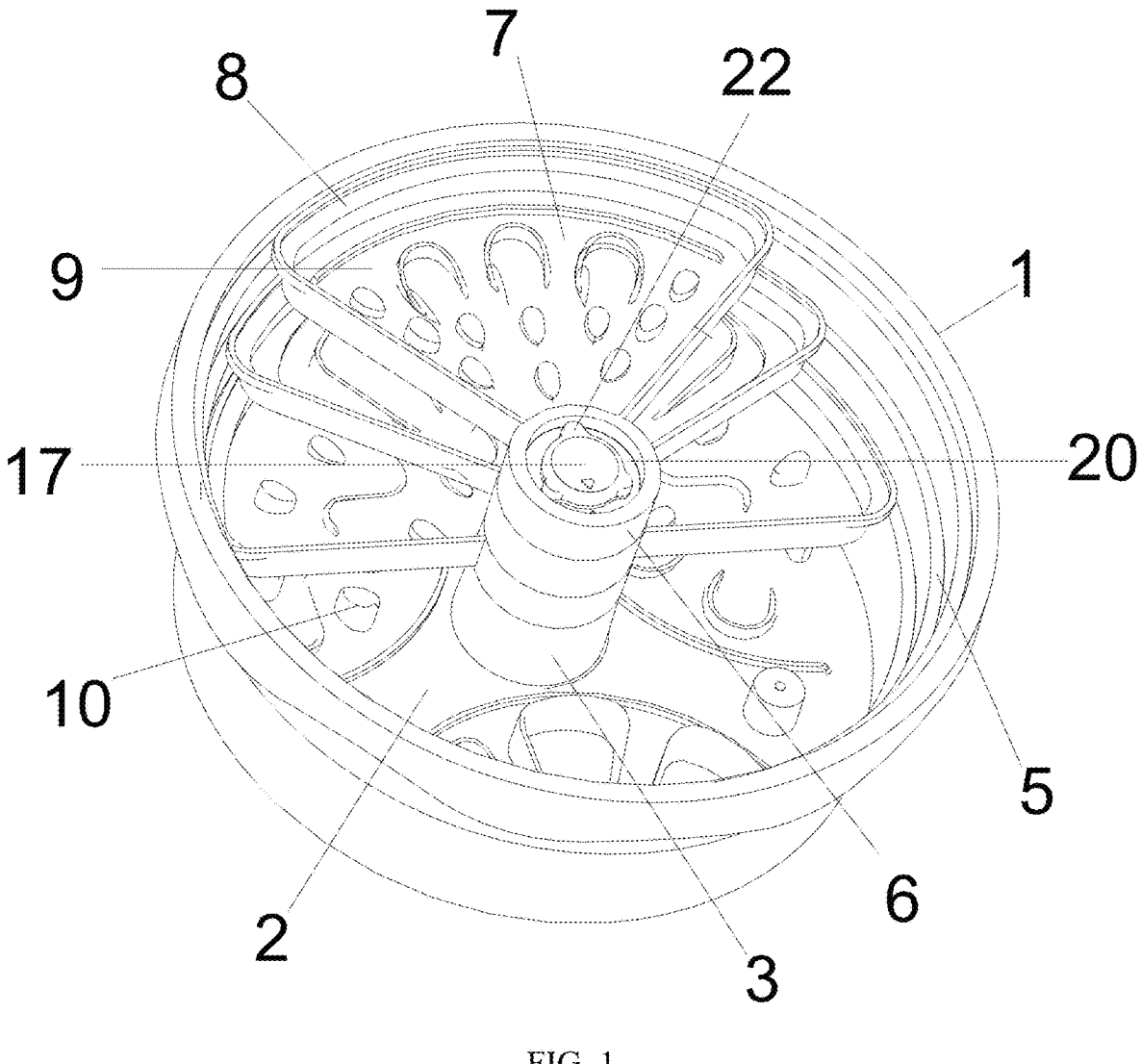
FIG. 1 is an overall schematic structural view of a slow feeder according to an embodiment of the present disclosure.

As shown in FIG. 1, an embodiment of the present disclosure provides a slow feeder, which includes a bowl 1, a connection assembly, and a slow feeding assembly.

Specifically, a first accommodating cavity 2 is provided in the bowl 1. The connection assembly is arranged in the first accommodating cavity 2. The at least one slow feeding assembly is rotatably connected to the connection assembly.

To feed a pet, first, some pet food is placed at a bottom of the first accommodating cavity 2, and then some pet food is placed on the at least one slow feeding assembly rotatably connected to the connection assembly. The pet needs to eat up the pet food in the at least one slow feeding assembly and rotate all the at least one slow feeding assembly, in order to eat the pet food at the bottom of the first accommodating cavity 2. In other words, a rotation process is additionally provided to slow down the eating speed of the pet and reduce the occurrence of digestive system diseases in the pet. A middle part of the first accommodating cavity 2 is fixedly connected with the connection assembly, and the connection assembly can provide a mounting position for the at least one slow feeding assembly.

As shown in FIG. 1, FIG. 3, FIG. 5, FIG. 7, FIG. 8, and FIG. 9, in an embodiment of the present disclosure, the connection assembly includes a first connecting rod 3 and a second connecting rod 4. A first end of the first connecting rod 3 is fixedly connected to a bottom of the first accommodating cavity 2. One end of the second connecting rod 4 is fixedly connected to a second end of the first connecting rod 3.

The at least one slow feeding assembly each includes: an annular step 5, a rotating ring 6, and a slow feeding tray 7. The annular step 5 is arranged on an inner wall of the first accommodating cavity 2. The rotating ring 6 is rotatably connected to the second connecting rod 4. A first end of the slow feeding tray 7 is fixedly connected to the rotating ring 6. A second end of the slow feeding tray 7 is provided with a sliding plate 8 slidably connected to the annular step 5. A second accommodating cavity 9 is provided inside the slow feeding tray 7.

The slow feeding tray 7 is fan-shaped. A circle center of the slow feeding tray 7 is fixedly connected to the rotating ring 6. An arc of the slow feeding tray 7 is slidably connected to an inner wall of the annular step 5.

Inner diameters of a plurality of annular steps 5 are in ascending order in a direction from the bottom of the first accommodating cavity 2 to outside of the first accommodating cavity 2.

To feed the pet, pet food is placed into the first accommodating cavity 2 inside the bowl 1, and then the rotating ring 6 rotatably connected to the second connecting rod 4 is rotated. Three rotating rings 6 are provided, which are stacked in the direction from the bottom of the first accommodating cavity 2 to the outside of the first accommodating cavity 2. Every two adjacent rotating rings 6 are in contact with each other. The rotating ring 6 adjacent to the bottom of the first accommodating cavity 2 is arranged at an end of the first connecting rod 3 away from the bottom of the first accommodating cavity 2. A diameter of the first connecting rod 3 is greater than a diameter of the second connecting rod 4. This ensures that after the rotating rings 6 are rotatably connected to the second connecting rod 4, there is a gap between the rotating ring 6 adjacent to the bottom of the first accommodating cavity 2 and the bottom of the first accommodating cavity 2, allowing the pet keeper to place pet food at the bottom of the first accommodating cavity 2.

Because the slow feeding tray 7 is fan-shaped, three slow feeding trays 7 are provided, and circle centers of the three slow feeding trays 7 are respectively fixedly connected to the three rotating rings 6. Three annular steps 5 are provided on the inner wall of the first accommodating cavity 2. Arcs of the three slow feeding trays 7 are respectively slidably connected to inner walls of the three annular steps 5. The arcs of the three slow feeding trays 7 are each fixedly connected with an arc-shaped sliding plate 8. The shape of each sliding plate 8 matches the shape of the corresponding slow feeding tray 7. The three sliding plates 8 are respectively slidably connected to upper surfaces of the three annular steps 5. As such, the sliding plates 8 respectively support the slow feeding trays 7, to prevent the slow feeding trays 7 from tilting downward, thereby ensuring the stability of the slow feeding trays 7.

In addition, inner diameters of the three annular steps 5 are in ascending order in the direction from the bottom of the first accommodating cavity 2 to the outside of the first accommodating cavity 2, and diameters of the slow feeding trays 7 are in ascending order in the direction from the bottom of the first accommodating cavity 2 to the outside of the first accommodating cavity 2. During assembly, the rotating rings 6 are sequentially sleeved on the second connecting rod 4 in the direction from the bottom of the first accommodating cavity 2 to the outside of the first accommodating cavity 2, so that the sliding plates 8 on the three slow feeding trays 7 can be respectively supported by the corresponding annular steps 5, thus completing the mounting of the slow feeding trays 7. Therefore, the slow feeding trays 7 can be conveniently mounted.

When pet food needs to be placed into the slow feeder, first, pet food is placed at the bottom of the first accommodating cavity 2, and then pet food is placed into the inside of the second accommodating cavities 9 on the slow feeding trays 7. Then, the three slow feeding trays 7 are rotated, so that the circle centers of the arcs of the three slow feeding trays 7 lie on the same straight line. As such, the pet has to eat up the pet food in the uppermost slow feeding tray 7 first, and then push the uppermost slow feeding tray 7 with its mouth in order to eat the pet food in the slow feeding tray 7 at the second layer. Only after pushing the bottom slow feeding tray 7, the pet can eat the pet food at the bottom of the first accommodating cavity 2. Because the pet needs to continuously push the slow feeding trays 7, the eating speed of the pet can be slowed down, and thus the occurrence of digestive system diseases in the pet can be reduced.

It should be noted that in the direction from the bottom of the first accommodating cavity 2 to the outside of the first accommodating cavity 2, a thickness of each slow feeding tray 7 is less than a thickness of the corresponding rotating ring 6, to ensure that there is a gap between adjacent slow feeding trays 7, and prevent adjacent slow feeding trays 7 from interfering with each other during rotation.

Figure 7:
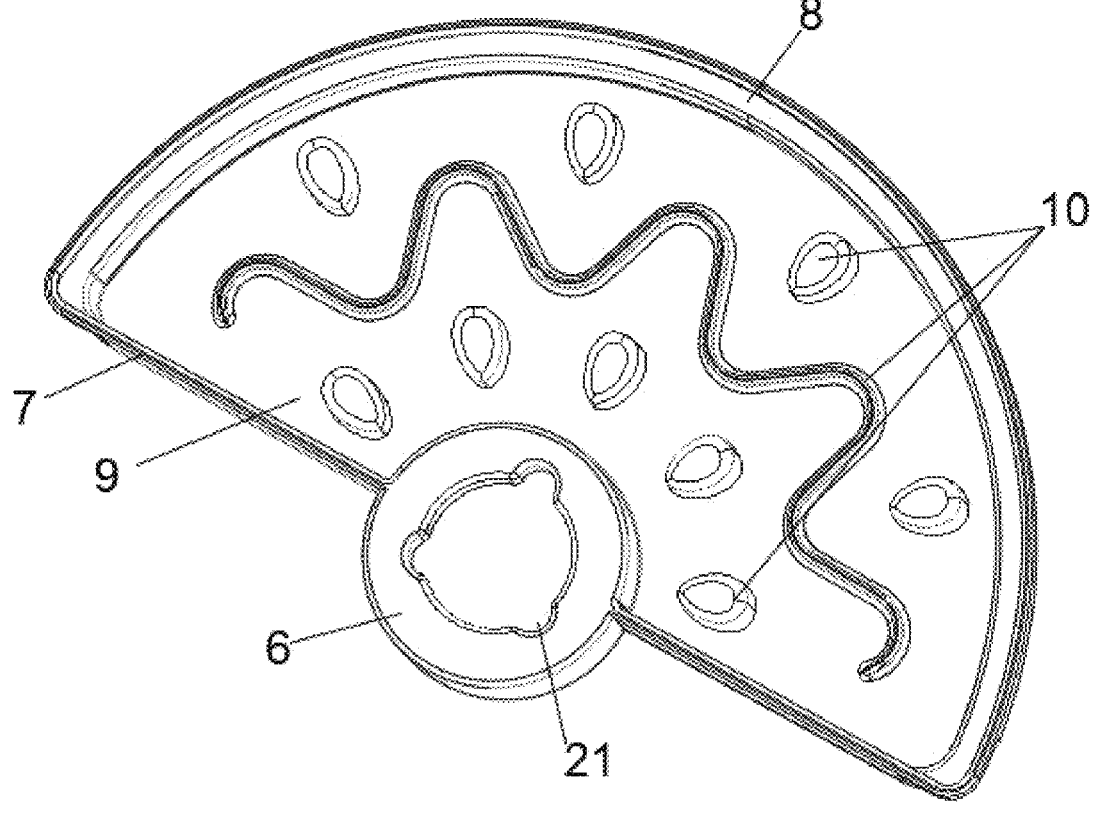
FIG. 7 is a schematic structural view of a bottom slow feeding tray according to an embodiment of the present disclosure.
Figure 8:
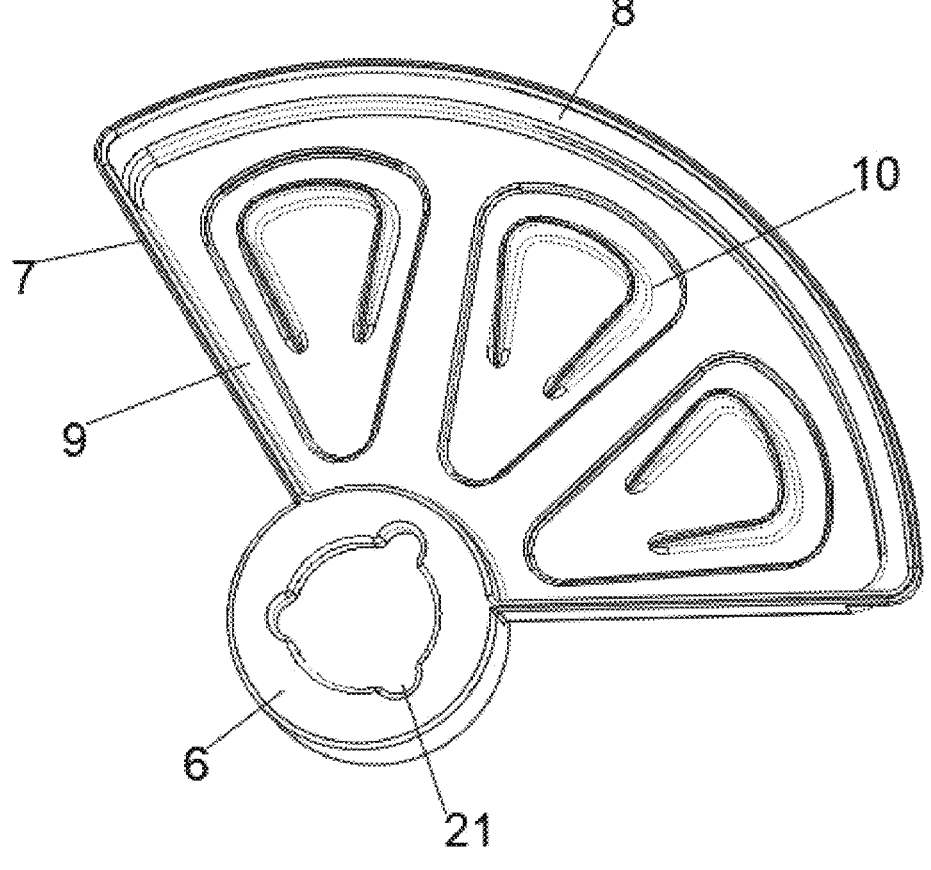
FIG. 8 is a schematic structural view of a middle slow feeding tray according to an embodiment of the present disclosure.
Figure 9:
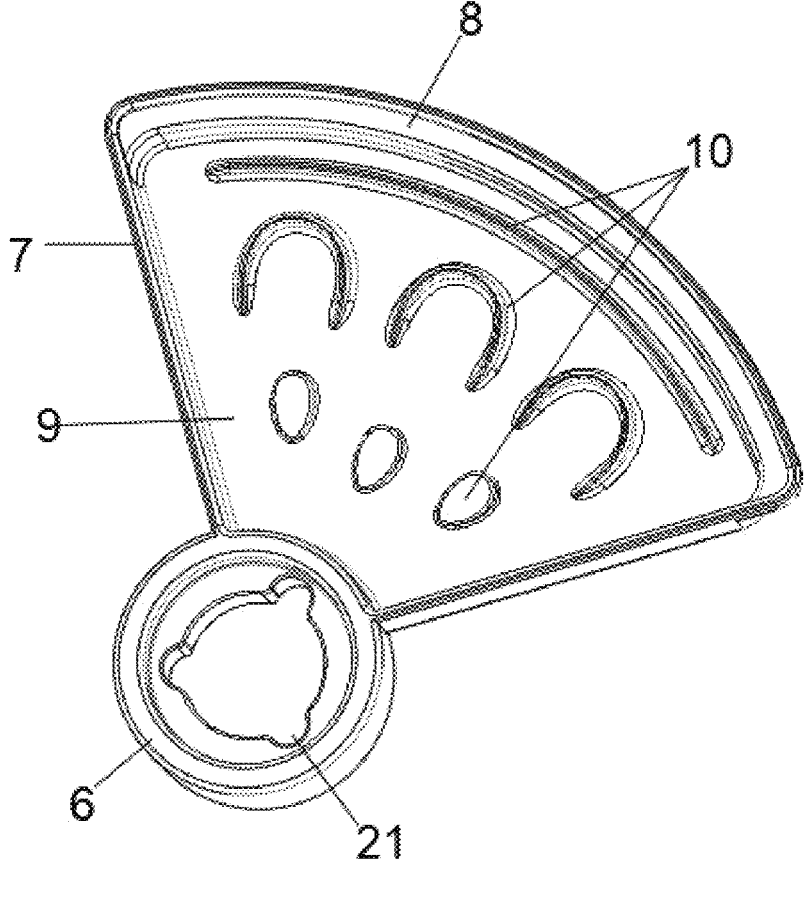
FIG. 9 is a schematic structural view of a top slow feeding tray according to an embodiment of the present disclosure.

As shown in FIG. 7 and FIG. 9, in an embodiment of the present disclosure, fan angles of a plurality of slow feeding trays 7 are in descending order in a direction from the bottom of the first accommodating cavity 2 to outside of the first accommodating cavity 2.

Because the fan angles of the slow feeding trays 7 are in descending order in the direction from the bottom of the first accommodating cavity 2 to the outside of the first accommodating cavity 2, it can be ensured that when the pet is eating, the slow feeding tray 7 away from the first accommodating cavity 2 does not completely cover the slow feeding tray 7 adjacent to the first accommodating cavity 2, and the pet can see clearly that there is pet food inside each slow feeding tray 7. As such, the eating desire of the pet is guaranteed. Meanwhile, the pet also has to eat up the pet food in each slow feeding tray 7 in sequence, so the eating speed of the pet is slowed down.

As shown in FIG. 1, FIG. 5, FIG. 7, FIG. 8, and FIG. 9, in an embodiment of the present disclosure, a first protrusion 10 is arranged on each of the bottom of the first accommodating cavity 2 and a bottom of the second accommodating cavity 9.

With the arrangement of the first protrusion 10 on each of the bottom of the first accommodating cavity 2 and the bottom of the second accommodating cavity 9, the first protrusions 10 serve as barriers when the pet is eating, thus slowing down the eating speed of the pet.

Figure 3:
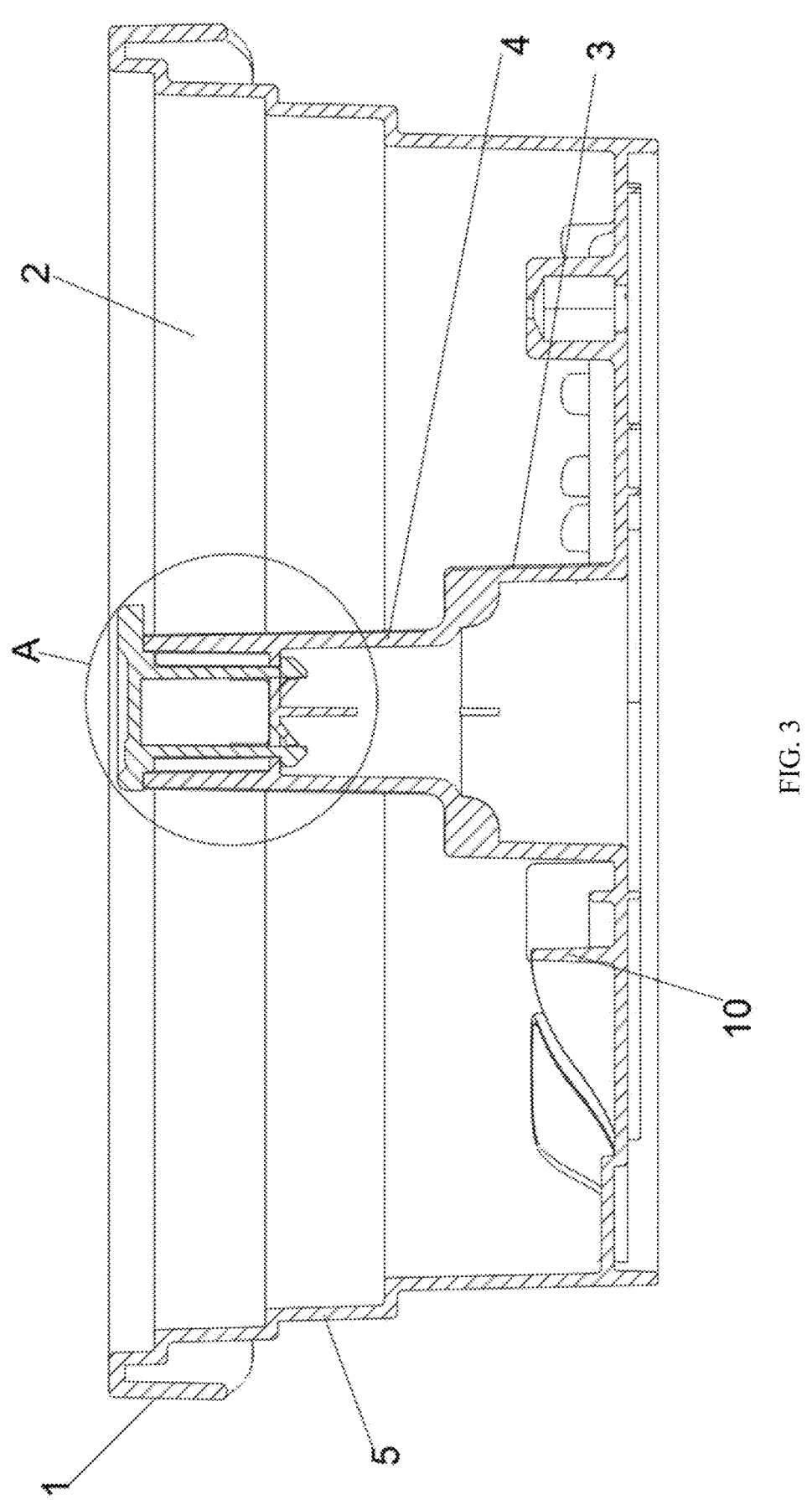
FIG. 3 is a schematic structural cross-sectional view of a slow feeder according to an embodiment of the present disclosure.
Figure 4:
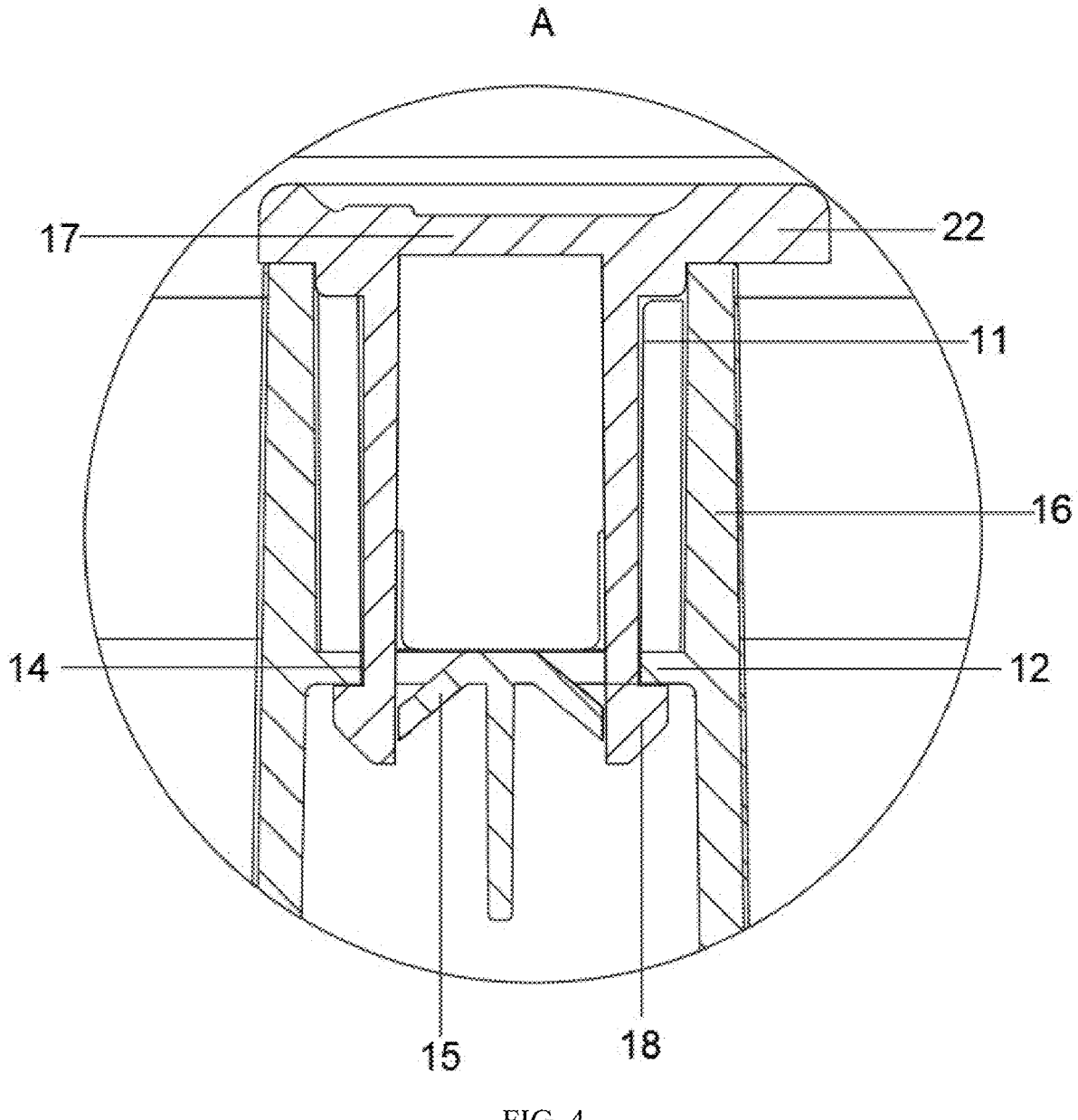
FIG. 4 is a schematic structural enlarged view of part A according to an embodiment of the present disclosure.
Figure 5:
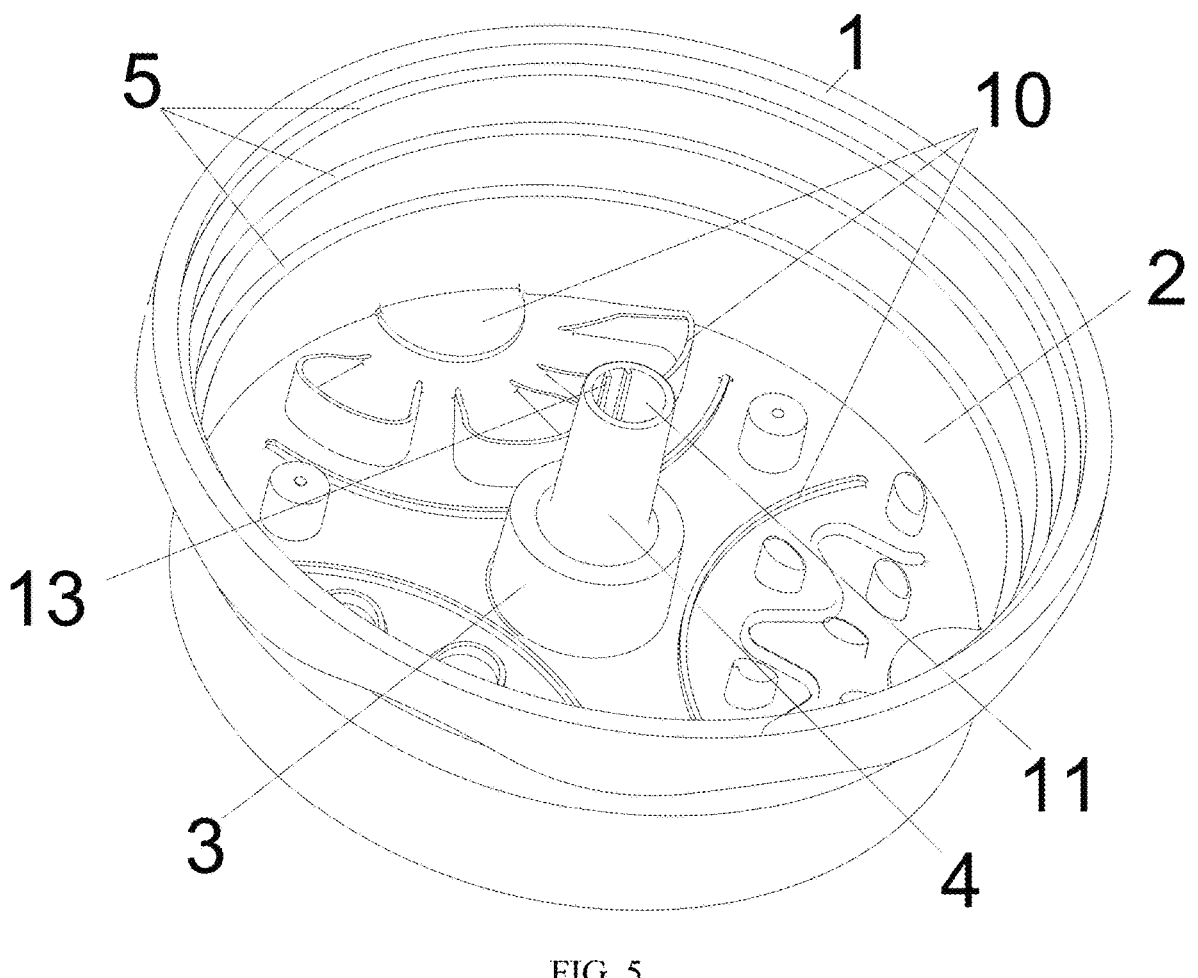
FIG. 5 is a schematic structural view of a bowl according to an embodiment of the present disclosure.
Figure 6:
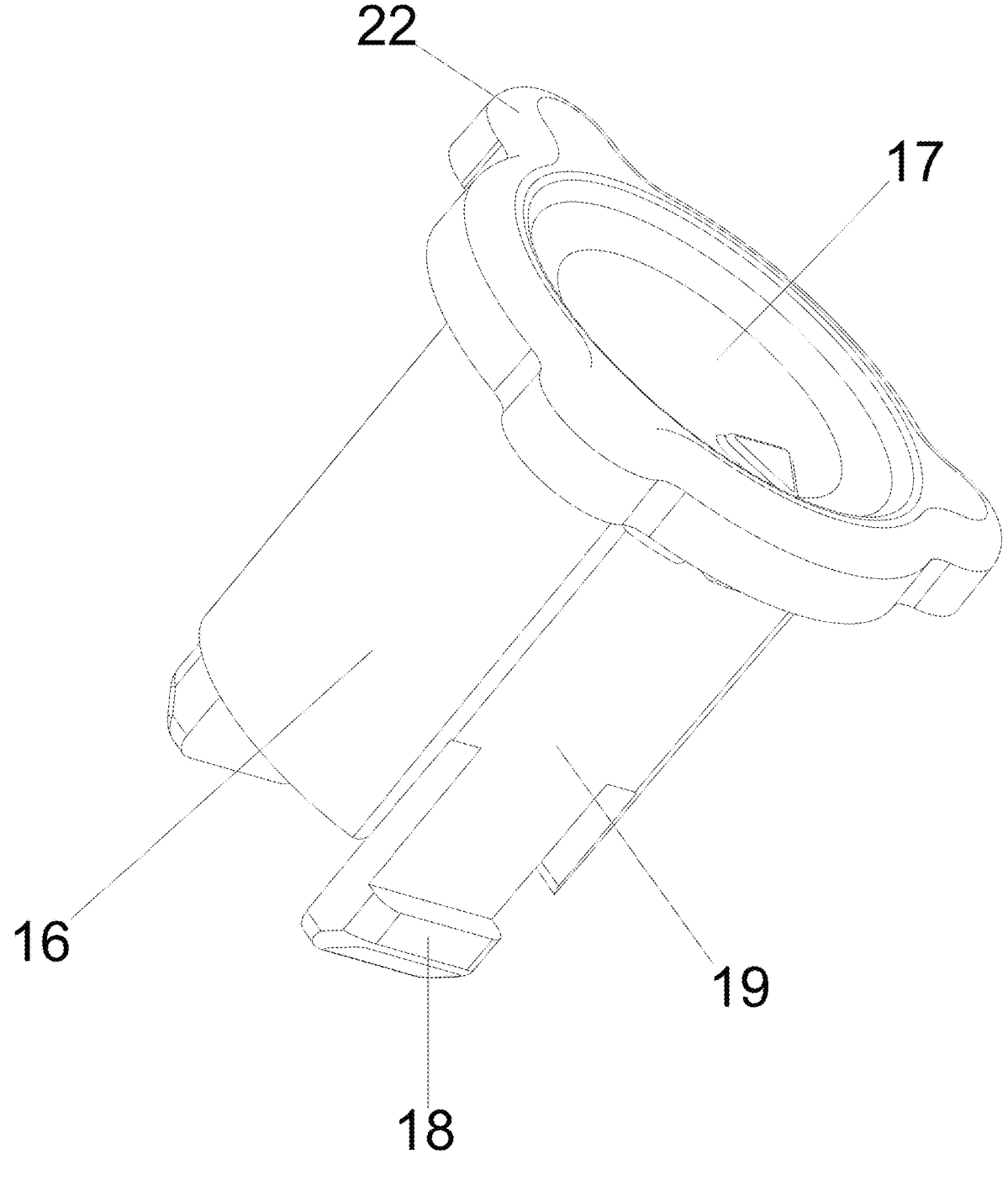
FIG. 6 is a schematic structural view of a second limiting member according to an embodiment of the present disclosure.

As shown in FIG. 3 and FIG. 4, in an embodiment of the present disclosure, the slow feeder further includes: a first through hole 11, provided in the second connecting rod 4; a connecting plate 12, arranged in the first through hole 11, where a side of the connecting plate 12 away from the first connecting rod 3 is provided with a slide rail 13, the slide rail 13 is arranged on an inner wall of the first through hole 11, and a second through hole 14 is provided on the connecting plate 12; a first limiting member 15, where a first end of the first limiting member 15 is fixedly connected to a side of the connecting plate 12 adjacent to the first connecting rod 3, and a second end of the first limiting member 15 is inclined toward the first connecting rod 3; a second limiting member 16, slidably connected to an interior of the first through hole 11, where the second limiting member 16 is arranged on the side of the connecting plate 12 away from the first connecting rod 3, the second limiting member 16 is provided with a positioning plane 19, the positioning plane 19 corresponds to a position of the slide rail 13, a length of the positioning plane 19 is greater than a length of the second limiting member 16, and the positioning plane 19 runs through the second through hole 14; a third limiting member 17, fixedly connected to an end of the second limiting member 16 away from the first connecting rod 3, where an outer diameter of the third limiting member 17 is greater than an inner diameter of the first through hole 11 and less than or equal to an outer diameter of the second connecting rod 4; a receiving groove 20, provided on a side of the rotating ring 6 away from the first connecting rod 3, where the third limiting member 17 is arranged in the receiving groove 20; a fourth limiting member 18, fixedly connected to an end of the positioning plane 19 away from the third limiting member 17, where the fourth limiting member 18 is arranged on the side of the connecting plate 12 adjacent to the first connecting rod 3; a positioning hole 21, provided on the rotating ring 6, where the positioning hole 21 is connected to an inner wall of the rotating ring 6; and a second protrusion 22, arranged on an outer wall of the third limiting member 17, where a shape of the second protrusion 22 matches a shape of the positioning hole 21.

When the position of the rotating ring 6 needs to be fixed, first, positioning planes 19 on two sides of the second limiting member 16 are respectively aligned with slide rails 13 on inner walls of two sides of the first through hole 11, and then the second limiting member 16 is inserted into the first through hole 11 in the second connecting rod 4. In this process, the positioning planes 19 respectively slide along the slide rails 13 toward the bottom of the first accommodating cavity 2. Through the cooperation of the positioning planes 19 and the slide rails 13, the second limiting member 16 will not rotate after being inserted into the first through hole 11. In the process of the second limiting member 16 entering the first through hole 11, the second limiting member 16 drives the fourth limiting member 18 fixedly connected to one end of each positioning plane 19 away from the third limiting member 17 to pass through the second through hole 14 on the connecting plate 12. The number of second through holes 14, the number of positioning planes 19, and the number of fourth limiting members 18 are two. The two positioning planes 19 and the two fourth limiting members 18 respectively pass through the two second through holes 14. Two first limiting members 15 are fixedly connected to a side of the connecting plate 12 adjacent to the first connecting rod 3. The first end of each of the two first limiting members 15 is fixedly connected to a middle part of the connecting plate 12. The second end of each of the two first limiting members 15 is inclined toward the first connecting rod 3.

The second through holes 14 are respectively blocked by the first limiting members 15. Therefore, when the fourth limiting member 18 passes through the corresponding second through hole 14, the fourth limiting member 18 first enters into contact with the corresponding first limiting member 15, and the first limiting member 15 applies a pushing force to the fourth limiting member 18, to cause the fourth limiting member 18 to gradually approach the inner wall of the first through hole 11. In this case, because there is a predetermined distance between an inner wall of the second through hole 14 and the inner wall of the first through hole 11, the fourth limiting member 18 fits to the side of the connecting plate 12 adjacent to the first connecting rod 3, and the first limiting member 15 always applies a pushing force to the fourth limiting member 18, so that the fourth limiting member 18 and the second through hole 14 are staggered to prevent the fourth limiting member 18 from sliding away from the bottom of the first accommodating cavity 2 through the second through hole 14. The fourth limiting member 18 functions to fix the second limiting member 16, to prevent the second limiting member 16 from being pulled out of the first through hole 11. After the position of the fourth limiting member 18 is fixed, the third limiting member 17 fixedly connected to an end of the second limiting member 16 away from the first connecting rod 3 is in contact with an end of the second connecting rod 4 away from the first connecting rod 3. Because the outer diameter of the third limiting member 17 is greater than the inner diameter of the first through hole 11 and less than or equal to the outer diameter of the second connecting rod 4, the third limiting member 17 will not extend into the first through hole 11. The receiving groove 20 is provided on the rotating ring 6 farthest from the bottom of the first accommodating cavity 2. The receiving groove 20 is located on a side of the rotating ring 6 away from the first connecting rod 3. The receiving groove 20 can provide a space for receiving the third limiting member 17. Three positioning holes 21 are provided at intervals on each of the rotating rings 6. The positioning holes 21 are connected to the inner wall of the rotating ring 6. Three second protrusions 22 are arranged at intervals on the outer wall of the third limiting member 17. The shape of the second protrusion 22 matches the shape of the positioning hole 21. To pull out the rotating ring 6, the three second protrusions 22 need to be respectively aligned with the three positioning holes 21, so that the rotating ring 6 can be pulled out together with the slow feeding tray 7. When the rotating ring 6 does not need to be pulled out, the rotating ring 6 is rotated, so that the second protrusions 22 are not aligned with the corresponding positioning holes 21, so as to prevent the pet from pulling out the slow feeding tray 7.

Figure 2:
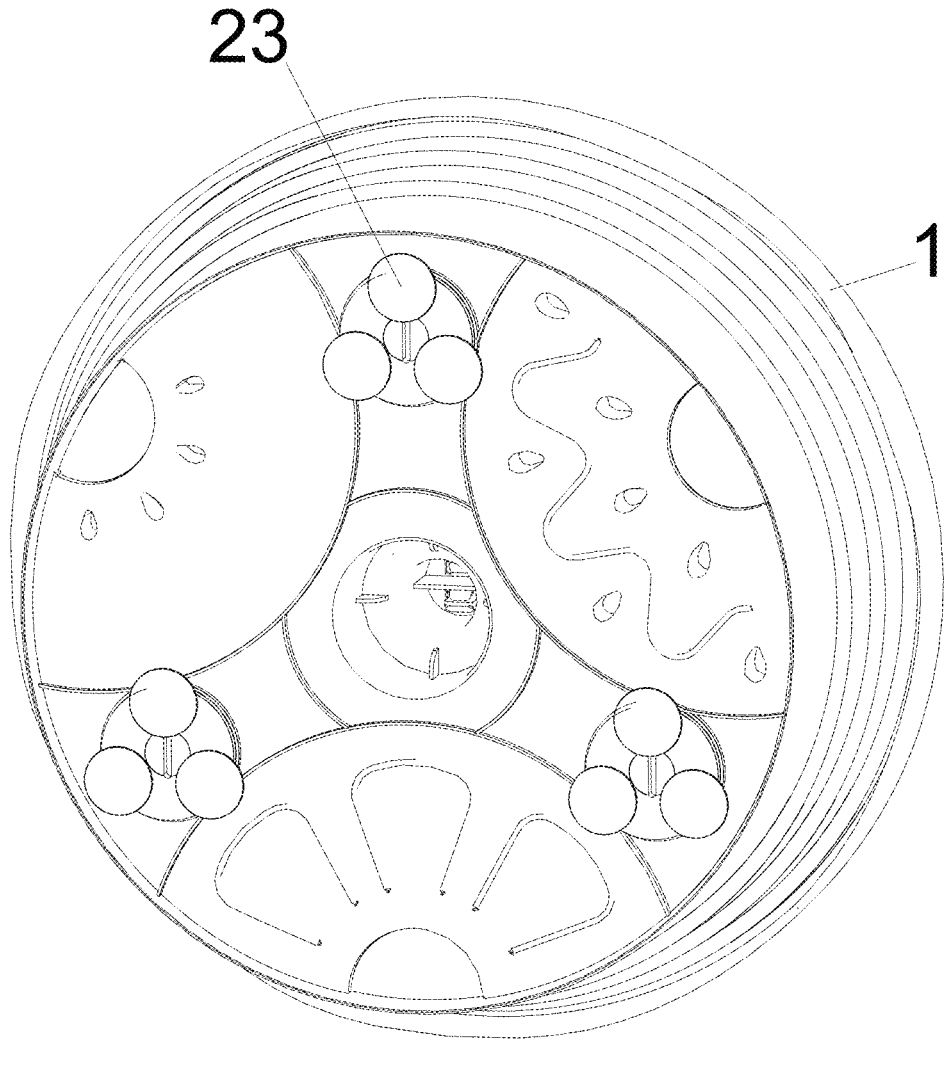
FIG. 2 is a schematic structural bottom view of a slow feeder according to an embodiment of the present disclosure.

As shown in FIG. 2, in an embodiment of the present disclosure, a suction cup 23 is arranged at a bottom of the bowl 1.

With the arrangement of the suction cup 23 at the bottom of the bowl 1, the bowl 1 can be attached to the ground, to prevent the bowl 1 from shaking and turning over.

The present disclosure has the following advantages.

1. During eating, a pet has to push the at least one slow feeding assembly in order to eat up all pet food inside the bowl. Because the at least one slow feeding assembly needs to be continuously pushed, the eating speed of the pet can be slowed down, thereby reducing the occurrence of digestive system diseases in the pet.

2. The connection assembly can provide a mounting position for the at least one slow feeding assembly to ensure that the at least one slow feeding assembly can rotate normally.

In the present disclosure, the terms such as "mount", "connect", "couple", "fix", and variants thereof should be interpreted in a broad sense. For example, "connection" may be a fixed connection, a detachable connection, or an integral connection; and "connection" may also be a direct connection or an indirect connection through an intermediate medium. For those of ordinary skill in the art, the specific meanings of the above terms in the present disclosure can be understood according to specific circumstances.

In the description of the present disclosure, it should be understood that the orientation or positional relationships indicated by the terms such as "inner" and "outer" are based on orientation or position relationships shown in the accompanying drawings, and are used only for ease and brevity of illustration and description, rather than indicating or implying that the mentioned apparatus or unit must have a particular orientation or must be constructed and operated in a particular orientation. Therefore, such terms should not be construed as limiting of the present disclosure.

In the description of this specification, the description with reference to the terms such as "an embodiment", "some embodiments", and "specific embodiment" means that specific features, structures, materials, or characteristics described in connection with the embodiment or example are embraced in at least one embodiment or example of the present disclosure. In this specification, exemplary descriptions of the foregoing terms do not necessarily refer to the same embodiment or example. Moreover, the described specific features, structures, materials, or characteristics may be combined in any suitable manner in one or more embodiments or examples.

The above description is merely preferred embodiments of the present disclosure, and is not intended to limit the present disclosure. To those skilled in the art, various modifications and variations may be made to the present disclosure. Any modification, equivalent replacement, or improvement made without departing from the spirit and principle of the present disclosure shall fall within the scope of protection of the present disclosure.

What is claimed is:

1. A slow feeder, comprising:

a bowl, wherein a first accommodating cavity is provided in the bowl;

a connection assembly, arranged in the first accommodating cavity, wherein the connection assembly comprises:

a first connecting rod, wherein a first end of the first connecting rod is fixedly connected to a bottom of the first accommodating cavity, and a second connecting rod, wherein an end of the second connecting rod is fixedly connected to a second end of the first connecting rod;

at least one slow feeding assembly, rotatably connected to the connection assembly, wherein the at least one slow feeding assembly comprises:

an annular step, arranged on an inner wall of the first accommodating cavity, a rotating ring, rotatably connected to the second connecting rod, and a slow feeding tray, wherein a first end of the slow feeding tray is fixedly connected to the rotating ring, a second end of the slow feeding tray is provided with a sliding plate slidably connected to the annular step, and a second accommodating cavity is provided inside the slow feeding tray;

a first through hole, provided in the second connecting rod;

a connecting plate, arranged in the first through hole, wherein a first side of the connecting plate away from the first connecting rod is provided with a slide rail, the slide rail is arranged on an inner wall of the first through hole, and a second through hole is provided on the connecting plate;

a first limiting member, wherein a first end of the first limiting member is fixedly connected to a second side of the connecting plate adjacent to the first connecting rod, and a second end of the first limiting member is inclined toward the first connecting rod;

a second limiting member, slidably connected to an interior of the first through hole, wherein the second limiting member is arranged on the first side of the connecting plate away from the first connecting rod, the second limiting member is provided with a positioning plane, the positioning plane corresponds to a position of the slide rail, a length of the positioning plane is greater than a length of the second limiting member, and the positioning plane runs through the second through hole;

a third limiting member, fixedly connected to an end of the second limiting member away from the first connecting rod, wherein an outer diameter of the third limiting member is greater than an inner diameter of the first through hole and less than or equal to an outer diameter of the second connecting rod;

a receiving groove, provided on a side of the rotating ring away from the first connecting rod, wherein the third limiting member is arranged in the receiving groove;

a fourth limiting member, fixedly connected to an end of the positioning plane away from the third limiting member, wherein the fourth limiting member is arranged on the second side of the connecting plate adjacent to the first connecting rod;

a positioning hole, provided on the rotating ring, wherein the positioning hole is connected to an inner wall of the rotating ring; and a second protrusion, arranged on an outer wall of the third limiting member, wherein a shape of the second protrusion matches a shape of the positioning hole.

2. The slow feeder according to claim 1, wherein the slow feeding tray is fan-shaped, a circle center of the slow feeding tray is fixedly connected to the rotating ring, and an arc of the slow feeding tray is slidably connected to an inner wall of the annular step.

3. The slow feeder according to claim 2, wherein fan angles of a plurality of slow feeding trays are in a descending order in a direction from the bottom of the first accommodating cavity to an outside of the first accommodating cavity.

4. The slow feeder according to claim 1, wherein inner diameters of a plurality of annular steps are in an ascending order in a direction from the bottom of the first accommodating cavity to an outside of the first accommodating cavity.

5. The slow feeder according to claim 1, wherein a first protrusion is arranged on each of the bottom of the first accommodating cavity and a bottom of the second accommodating cavity.

6. The slow feeder according to claim 1, wherein a suction cup is arranged at a bottom of the bowl.

\* \* \* \* \*